Dec. 15, 1936.   H. J. KRATZER   2,063,936
BRAKE
Filed Sept. 25, 1931
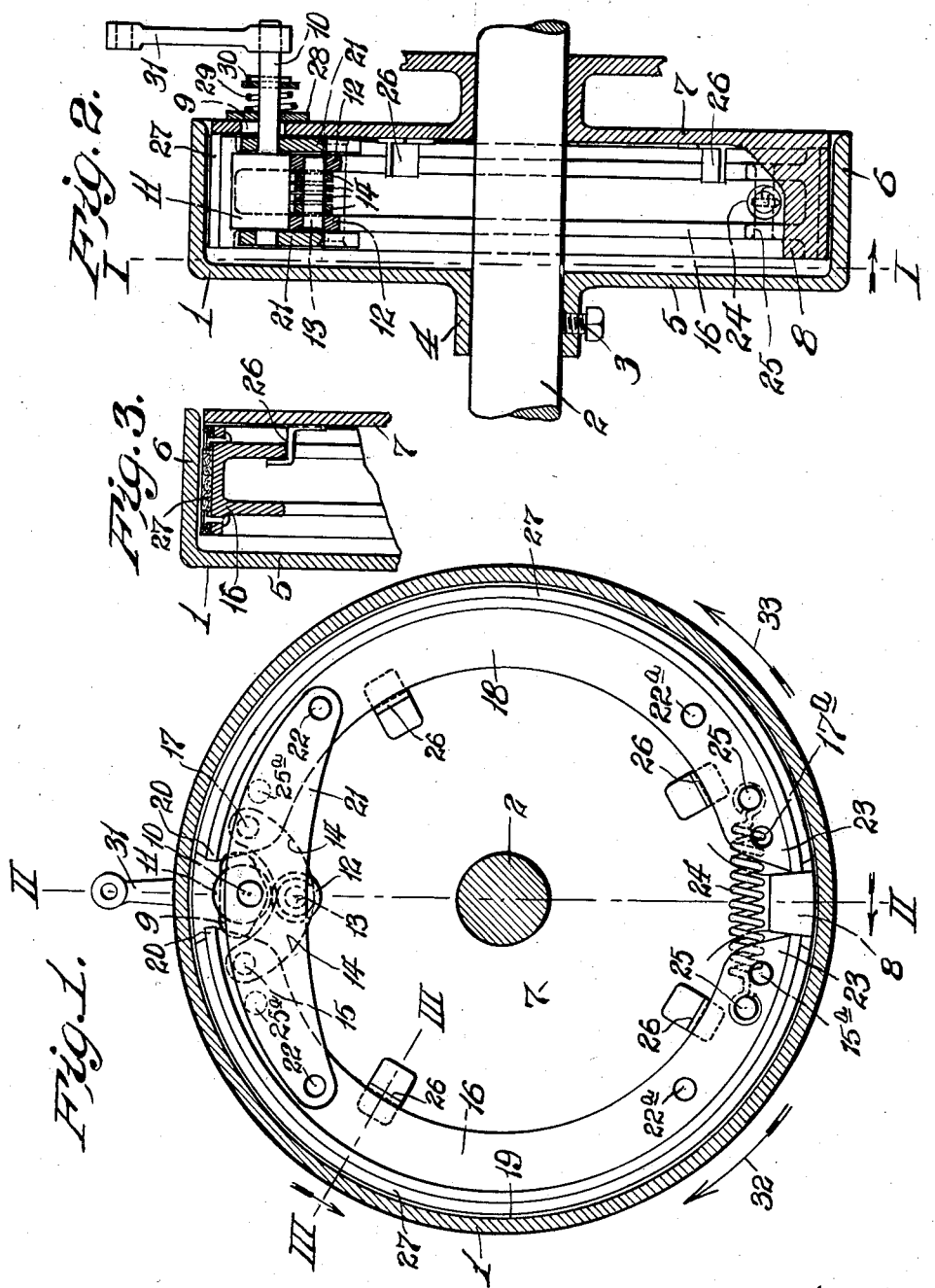
Inventor:
H. J. Kratzer.
By Herbert G. Fletcher
Atty.

Patented Dec. 15, 1936

2,063,936

UNITED STATES PATENT OFFICE 2,063,936

BRAKE

Herbert J. Kratzer, St. Louis, Mo.

Application September 25, 1931, Serial No. 565,143

16 Claims. (Cl. 188—78)

This invention relates to certain new and useful improvements in brakes and particularly that class of brakes providing a servoaction, this application being a furthering of the improvements contained in my co-pending application for brakes filed July 12, 1929, under Serial No. 377,686, the instant application however disclosing a structure in which both the braking mechanisms and the operating mechanism are full-floating, the primary object of the invention being to provide an improved servoaction brake.

Another object of the invention is in providing an improved combination of elements for slowing or stopping revolving brake drums in a manner wherein the braking of the drum in either direction of rotation is dependent entirely on the revolving action of the brake drum after the mechanisms have been positioned to engage the friction shoes against the drum.

A further object of the invention is in providing the operating mechanisms of dual or reversible parts thereby eliminating the heretofore necessary use of left and right parts.

A still further object of the invention is in providing a brake drum of a unique combination of operating mechanisms whereby a minimum of operating movement is required for effecting the parts to operating positions with respect to the drum to be braked.

Another still further object of the invention is in providing the operating mechanisms within the drum with improved means for amplifying the braking action on the shoes for their engagement with the inner periphery of the drum.

Other and further objects will appear in the specification and be specifically pointed out in the appended claims, reference being had to the accompanying drawing, exemplifying the invention, and in which:—

Figure 1 is a vertical section taken through a brake drum approximately on line I—I of Fig. 2, showing this improved brake structure.

Figure 2 is a vertical section taken approximately on the line II—II of Fig. 1.

Figure 3 is a fragmentary transverse section taken approximately on the line III—III of Fig. 1.

Referring by numerals to the accompanying drawing, 1 designates a brake drum which may be secured to a revolving element such as a vehicle wheel, or may be secured to a rotating shaft 2 or the like by the set screw 3 which is passed through the hub 4 of the brake drum.

The brake drum 1 is provided with a relatively wide annular portion 6 extending from the side wall 5 of the drum and mounted over the shaft 2 opposite the side wall 5 is a stationarily held wall or plate 7 forming a closure to the drum 1.

Formed integral with the wall 7 at its lower end and extending into the drum 1 is a lug 8 and formed in said wall in opposite disposition to the lug 8 is an elongated opening 9 and extended through said opening and into the drum is a short shaft 10 having an eccentric 11 thereon, the periphery of said eccentric being borne against by a pair of rollers 12 which are carried by the pin 13 of a plurality of links 14.

The eccentric 11, pin 13 and links 14 are disposed in the drum between the walls 5 and 7 thereof and the said links are extended upwardly from the pin 13 in a converging manner so that the links on one side are secured to a pin 15 of a brake shoe 16 and the links on the other side are secured to a pin 17 on the brake shoe 18, the brake shoes 16 and 18 each being approximately semi-circular so as to engage practically the entire inner periphery 19 of the annular portion 6 of the brake drum.

The brake shoes 16 and 18 are of a channel shape and the upwardly extending ends of the links 14 are disposed within the channel of respective shoes and as shown in Fig. 1, the eccentric 11 is disposed between the ends 20 of respective shoes. Connecting the shoes 16 and 18 at a distance from the ends thereof are a pair of links 21, each link being disposed on opposite sides of the channel of the brake shoes and are secured to respective brake shoes by the pins 22 and connecting the opposite ends 23 of the shoes is a coil spring 24, said coil spring lying in the channel of respective shoes and being secured to the shoes by respective pins 25. The shaft 10 bearing the eccentric 11 is supported in and borne by the links 21.

Concentrically disposed around the shaft 2 and fixed to the plate 7 are a plurality of rests or brackets 26 against which the shoes 16 and 18 normally engage and rest and are held in this position by the retracting action of the coil spring 24 and in this position the friction material 27 on the face of each of the shoes is free from engagement with the inner periphery 19 of the annular flange 6 of the drum and the ends 23 of the shoes are held in abutment with the lug 8 of the plate 7.

Mounted on the end of the shaft 10 which extends through the elongated opening 9 is a closure plate 28 which is resiliently held in closed position against said opening by the coil spring 29 which is disposed between the plate 28 and the pin held washer 30, and fixed to the end of the shaft 10 is a rock lever 31 to which the pulling mechanism (not shown) is attached.

In the operation of this improved brake, assuming that the drum 1 is turned in the direction of the arrow 32 and the lever 31 is pulled so that the shaft 10 is rocked, the eccentric 11 obviously will be turned and the rollers 12 in underengagement therewith and the pin 13 on which the rollers and links 14 are supported will be forced inwardly or downwardly thereby causing the said links to exert an inward pull on the ends 20 of respective shoes 16 and 18 by reason of said shoes fulcruming on respective pins 22 of the links 21.

This inward movement of the ends 20 of the shoes will force the opposite ends 23 of said shoes outwardly thus forcing the friction material 27 at the ends 23 of the shoes into frictional engagement with the inner periphery 19 of the drum, the frictional engagement of the shoe 16 at its end 23 with the inner periphery 19 forcing said shoe to move in the direction in which the drum 1 is turning whereas the shoe 18 will be prevented from moving with the revolving drum by reason of the end 23 thereof being held in abutment with the lug 8.

The engaging of the end 23 of the shoe 16 with the inner periphery 19 of the drum and consequent pushing movement given to the shoe by the drum will create a pushing impulse from said shoe 16, through the links 21 to the shoe 18, the pushing impulse on the links 21 to the shoe 18 causing a counter-action from the shoe 18 by reason of said shoe being in abutment with the lug 8 thus relaying the counter pushing pressure of the shoe 18 back through the links 21 to the rear end 20 of the shoe 18 thereby forcing the entire surface of the frictional material 27 of the shoe 18 against the inner periphery 19, and simultaneously the same counter-acting forces through the links 21 to the shoe 16 will also cause the entire area of the frictional material 27 of said shoe 16 to be forced against the inner periphery 19.

When the brake drum 1 is turned in the direction of the arrow 33 and the shaft 10 is rocked for operating the eccentric 11 to force inward pulling movement of the links 14 as above described, it is obvious that the end 23 of the shoe 16 will be held from being moved by gripping engagement of the inner periphery 19 of the drum therewith on account of the end 23 abutting the lug 8 whereas the end 23 of the shoe 18 will be forced to grip the inner periphery 19 of the drum thus causing the shoe 18 to be pushed in the direction of travel of the drum and the shoe 18 will create a pushing impulse on the links 21 and the pushing impulse will be carried to the end 20 of the shoe 16 thus causing the end 20 of the shoe 16 to fold outwardly so that the friction material 27 of the shoe 16 will be forced in gripping contact with the inner periphery 19 of the drum.

Counter pushing action will then be effected from the shoe 16 back through the links 21 to the end 20 of the shoes 18 for causing said end 20 and the friction material 27 thereof to be folded outwardly against the inner periphery 19 of the drum thus giving full braking action of the shoes against the drum 1. The amount of gripping effect of the shoes against the drum being determined by the amount of eccentric action of the eccentric 11 on the links 14.

From the above description relative to the action of the shoes on the drum when the drum is revolved in either direction, it is clear that complete and equal servo braking action is provided as the direction of revolving of the drum determines which one of the pair of shoes provides the pilot action for the other shoe and as the result in action or consequence of the free shoe actuated is the same, it is therefore obvious that the structure disclosed provides a brake which is equally effective when providing braking action on a drum in either direction of rotation of the drum.

When braking action on the drum 1 has been effected by the shoes 16 and 18, upon release of the pulling action on the rock lever 31, it is obvious that a return spring or the like (not shown) can be provided for rotating the eccentric 11 to a neutral or inactive position on the links 14 and when this has been effected, the spring 24 will draw the brake shoe which has been parted or moved from abutment with the lug 8 to its abutting position with the lug 8, the moving in of the particular shoe effecting a retrieving action on the links 14 and 21 and the opposite shoe so that both of the shoes will return to resting position against the stops or rests 26.

Attention is particularly directed to the fact that the elements of the structure and their cooperating parts are free from being anchored or suspended in any way from the fixed plate 7, and the operating shaft 10 which is carried by the links 21 is free to be moved with said links as the elongated opening 9 in the plate 7 through its shaft 10 is extended permits lateral movement of the shaft.

The ends 23 of respective shoes 16 and 18 may be termed the "pilot ends" for the reason that they are initially engaged with the inner periphery 19 of the drum 1, and in the event of a consequent wear of the friction material 27 on the ends 23, the shoes 16 and 18 may each be reversed from their present positions and the pins 15 and 17 can be located in the openings 15a and 17a respectively and the pins 22 can be mounted in respective openings 22a and obviously the spring pins 25 will be mounted in respective openings 25a.

After braking, when the operating lever 31 is released and permitted to be moved to its neutral position, the retrieving action of the spring 24 will act to draw the shoes from engagement with the periphery 19 of the drum to seating positions on the rests 26.

It is obvious that various changes may be made in the details of construction without departing from the spirit of this invention, and it is therefore to be understood that this invention is not to be limited to the specific construction shown and described, as it is clear that an application of hydraulic power may be used instead of the eccentric 11 on the rollers 12 of the links 14 by the interposing of a fluid sylphon.

What I claim is:—

1. A servobrake of the internal expansion type comprising a pair of unanchored pivoted shoes, an anchored stop between adjacent ends of said shoes, pivoted means connected to the opposite ends of said shoes, and unanchored means active on said pivoted means for applying inward movement to said opposite ends of said shoes.

2. A brake comprising a pair of link connected shoes, either of which is capable of being held against circumferential movement, a revolvable drum, toggle members connected to the ends of said shoes adjacent the connecting link thereof, and means carried by said connecting link active to cause one of said shoes to grip the drum and move in the direction of travel of said drum.

3. A brake comprising a pair of link connected shoes, a revolvable drum, a fixed stop adjacent the inner periphery of said drum between adjacent ends of said shoes, and means carried by said link cooperable to act on the opposite ends of said shoes for swinging said shoes on the pivots of said link.

4. A brake comprising a fixed part and a revolvable drum, a pair of shoes each having adjacent ends normally held in abutment with said part, a tying link to which said shoes are pivotally secured, and means carried by said link active on the other adjacent ends of said shoes for swinging said shoes on respective pivots of said link.

5. A brake comprising a fixed part and a revolvable drum, a pair of shoes each having adjacent ends normally held in abutment with said part, a tying link to which said shoes are pivotally secured, and an eccentric having cooperable relation with said shoes for swinging said shoes on respective pivots of said link.

6. A servobrake of the internal expansion type comprising a revolvable drum, a pair of unanchored pivoted shoes, an anchored stop between adjacent ends of said shoes, said shoes having oppositely connected ends, resilient means connecting said shoes adjacent said stop, and unanchored means for applying inward movement to the connected ends of said shoes for forcing the opposite ends of said shoes outward.

7. A brake comprising a pair of link connected shoes, a revolvable drum, a fixed stop adjacent the inner periphery of said drum between adjacent ends of said shoes, toggle links connecting the opposite ends of said shoes, and means cooperable with said toggle links for swinging said shoes on the pivots of said link.

8. A brake comprising a fixed part and a revolvable drum, a pair of shoes each having adjacent ends normally held in abutment with said part, a tying link to which said shoes are pivotally secured, and means supported by said link having cooperable relation with said shoes for swinging said shoes on respective pivots of said link.

9. A brake comprising a revolvable drum, a pair of shoes, a pair of links secured to and straddling adjacent ends of said shoes, toggle links secured to said shoes and located between said pair of links, an eccentric supported from and between said pair of links having cooperable relation with said toggle links, and a fixed stop cooperable with the opposite ends of said shoes.

10. A brake comprising a pair of link connected shoes, a revolvable drum, a fixed stop within said drum disposed between adjacent ends of said shoes, centering means for said shoes, and means carried by the connecting link of said shoes active on the opposite ends of said shoes for swinging said shoes on the pivots of said link.

11. A brake comprising a pair of shoes, a link pivotally connected at its ends to said shoes, a revolvable drum, a fixed stop adjacent the inner periphery of said drum between adjacent ends of said shoes, means connecting the opposite adjacent ends of said shoes to each other, and means cooperable with said first mentioned means for causing said first mentioned means to swing said shoes on the pivots of said link.

12. A servobrake of the internal expansion type having a pair of unanchored shoes, a link connecting said shoes, and means carried by said link active to cause adjacent ends of said shoes to move inwardly.

13. A brake including a pair of shoes, a link pivoted at its ends to respective shoes, and actuating means carried by said link having cooperable relation with said shoes for swinging them on the pivots of said link.

14. A brake including a pair of shoes, a link pivoted at its ends to respective connecting shoes, means connecting adjacent ends of the shoes, and actuating means carried by said link and being cooperable with said first means to swing the shoes on the pivots of said link.

15. A brake including a pair of shoes, a link pivoted at its ends to respective connecting shoes, a revolvable drum, a fixed stop between adjacent ends of said shoes, and means carried by said link having cooperable relation with said shoes for swinging them on the pivots of said link.

16. A brake comprising a pair of pivotally supported shoes, either of which is held against circumferential movement when the other is permitted circumferential movement, a revolvable drum, pivoted means connecting adjacent ends of said shoes, and means active on said pivoted means for inwardly moving said adjacent shoe ends.

HERBERT J. KRATZER.